(12) United States Patent
Hineno et al.

(10) Patent No.: US 9,777,796 B2
(45) Date of Patent: Oct. 3, 2017

(54) FRICTION DRIVE BELT AND METHOD FOR PRODUCING SAME

(71) Applicant: Mitsuboshi Belting Ltd., Kobe-shi, Hyogo (JP)

(72) Inventors: Yorifumi Hineno, Hyogo (JP); Takaaki Kan, Hyogo (JP)

(73) Assignee: Mitsuboshi Belting Ltd. (JP)

(*) Notice: Subject to any disclaimer, the term of this patent is extended or adjusted under 35 U.S.C. 154(b) by 343 days.

(21) Appl. No.: 14/383,632

(22) PCT Filed: Mar. 7, 2013

(86) PCT No.: PCT/JP2013/056307
§ 371 (c)(1),
(2) Date: Sep. 8, 2014

(87) PCT Pub. No.: WO2013/133378
PCT Pub. Date: Sep. 12, 2013

(65) Prior Publication Data
US 2015/0024892 A1    Jan. 22, 2015

(30) Foreign Application Priority Data
Mar. 9, 2012  (JP) ................. 2012-052759

(51) Int. Cl.
| C08L 23/16 | (2006.01) |
| F16G 5/04 | (2006.01) |
| F16G 1/10 | (2006.01) |
| F16G 5/08 | (2006.01) |
| B29C 35/02 | (2006.01) |
| B29D 29/10 | (2006.01) |
| B29K 19/00 | (2006.01) |
| B29K 509/00 | (2006.01) |
| B29L 31/00 | (2006.01) |

(52) U.S. Cl.
CPC ............... F16G 5/04 (2013.01); B29C 35/02 (2013.01); B29D 29/10 (2013.01); C08L 23/16 (2013.01); F16G 1/10 (2013.01); F16G 5/08 (2013.01); B29K 2019/00 (2013.01); B29K 2509/00 (2013.01); B29L 2031/7094 (2013.01)

(58) Field of Classification Search
CPC .......... F16G 5/04; B29C 35/02; B29D 29/10; B29K 2019/00
See application file for complete search history.

(56) References Cited

U.S. PATENT DOCUMENTS 8,871,329 B2   10/2014  Yoshida et al.
8,979,692 B2    3/2015  Matsuda et al.
(Continued)

FOREIGN PATENT DOCUMENTS

CN     101070895 A    11/2007
CN     102153792 A     8/2011
(Continued)

OTHER PUBLICATIONS

Office Action issued Jul. 13, 2015 in corresponding Chinese Patent Application No. 201380013244.7.
(Continued)

Primary Examiner — Mark Kaucher
(74) Attorney, Agent, or Firm — Wood, Phillips, Katz, Clark & Mortimer (57) ABSTRACT

The present invention relates to a friction transmission belt having a friction transmission part, in which the friction transmission part is formed of a rubber composition containing an ethylene-α-olefin elastomer, a mineral-based filler and a surfactant.

12 Claims, 3 Drawing Sheets

(56) References Cited

U.S. PATENT DOCUMENTS

| | | | |
|---|---|---|---|
| 2009/0048048 | A1 | 2/2009 | Nakamura et al. |
| 2010/0029857 | A1* | 2/2010 | Soddemann .............. C08K 5/17 |
| | | | 525/326.3 |
| 2011/0300981 | A1 | 12/2011 | Takahashi et al. |
| 2012/0021858 | A1* | 1/2012 | Matsuda .................. F16G 5/20 |
| | | | 474/237 |

FOREIGN PATENT DOCUMENTS

| | | |
|---|---|---|
| CN | 102362094 A | 2/2012 |
| DE | 102004062725 A1 | 6/2006 |
| JP | 2008-195914 A | 8/2008 |
| JP | 4763626 B | 8/2008 |
| JP | 2009-024757 A | 2/2009 |
| JP | 2009-024779 A | 2/2009 |
| JP | 2009-115199 A | 5/2009 |
| JP | 2009-250293 A | 10/2009 |
| JP | 2011-252510 A | 12/2011 |

OTHER PUBLICATIONS

Notification of Reasons for Refusal, issued Oct. 21, 2014 in corresponding Japanese Appln. No. 2012-052759.
Extended European Search Report, issued Jan. 25, 2016 in counterpart European patent application No. 13758136.9.

* cited by examiner

FRICTION DRIVE BELT AND METHOD FOR PRODUCING SAME

TECHNICAL FIELD

The present invention relates to a friction transmission belt capable of achieving both of power transmission properties and noise suppression properties in a wet (water-dampened) state, and to a method for producing the same.

BACKGROUND ART

A friction transmission belt is widely used for power transmission of auxiliary drive of an automobile, such as air compressor or alternator. In recent years, a requirement of silencing (quietness) against automobiles is increasing, and in particular, in a driving device, a sound other than an engine sound is regarded as a strange sound (or a noise), and therefore, a countermeasure to noise generation in the friction transmission belt is demanded. One of the strange sounds of the friction transmission belt is a slip noise generated when water intrudes into an engine room at running in rain or the like and the water attaches between a belt and a pulley, whereby the belt slips. A method for preventing such a slip noise in a wet (water-dampened) state is investigated.

For example, Japanese Patent No. 4763626 (Patent Document 1) discloses a friction transmission belt in which at least a friction transmission surface is constituted of a rubber composition in which a surfactant is blended in a prescribed proportion in an ethylene-α-olefin elastomer. In addition, JP-A-2011-252510 (Patent Document 2) discloses a friction transmission belt having a compressed rubber layer constituted of a rubber composition in which silica having a nitrogen adsorption specific surface area (BET) in the range of from 100 to 300 m$^2$/g, either one of a polyamide short fiber and a para-aramid short fiber, and a cotton short fiber are blended in prescribed proportions in an ethylene-α-olefin elastomer. But, in these friction transmission belts, not only the slip noise in a wet state cannot be effectively suppressed yet, but the power transmission properties are not sufficient.

PRIOR ART DOCUMENT

Patent Document

Patent Document 1: Japanese Patent No. 4763626
Patent Document 2: JP-A-2011-252510

SUMMARY OF THE INVENTION

Problem to be Solved by the Invention

In consequence, an object of the present invention is to provide a friction transmission belt capable of achieving both of power transmission properties and noise suppression properties (quietness) in a wet (water-dampened) state and a method for producing the same.

Another object of the present invention is to provide a friction transmission belt which is high in power transmission properties in a dry state, too and a method for producing the same.

A still another object of the present invention is to provide a friction transmission belt which is excellent in wear resistance, too and a method for producing the same.

Means for Solving the Problem

In order to achieve the above-described problems, the present inventors made extensive and intensive investigations. As a result, they found that when a friction transmission part of a friction transmission belt is formed of a rubber composition in which an ethylene-α-olefin elastomer, a mineral-based filler and a surfactant are combined, maybe because a difference in coefficient of friction between a dry state and a wet state can be reduced, it is possible to achieve both of the power transmission properties and the noise suppression properties in a wet state, and they accomplished the present invention.

That is, the friction transmission belt of the present invention has a friction transmission part, and the friction transmission part is formed of a rubber composition containing an ethylene-α-olefin elastomer, a mineral-based filler and a surfactant.

The mineral-based filler may be at least one member selected from the group consisting of a metal carbonate (e.g., calcium carbonate), a metal silicate (e.g., magnesium silicate, aluminum silicate, calcium silicate, talc, clay), and a metal oxide (e.g., silica). A proportion of the mineral-based filler may be from about 5 to 50 parts by mass based on 100 parts by mass of the ethylene-α-olefin elastomer. A primary average particle diameter of the mineral-based filler may be from about 0.5 to 20 μm. A pH of the mineral-based filler may be 7 or more in accordance with JIS K5101 (2004). It is to be noted that the pH of the mineral-based filler as referred to in the present description means a pH of an aqueous suspension of the mineral-based filler (e.g., an aqueous suspension of the mineral-based filler having a mass fraction of 10%).

The surfactant may be a nonionic surfactant (e.g., an ether type nonionic surfactant). A proportion of the surfactant may be from about 2 to 15 parts by mass based on 100 parts by mass of the ethylene-α-olefin elastomer.

The rubber composition may further contain at least one member selected from the group consisting of a paraffin-based plasticizer, carbon black and a short fiber.

The present invention also includes a method for producing the friction transmission belt by vulcanizing an unvulcanized rubber sheet formed of a rubber composition containing an ethylene-α-olefin elastomer, a mineral-based filler and a surfactant.

Effect of the Invention

In the present invention, since the friction transmission part is formed by combining an ethylene-α-olefin elastomer, a mineral-based filler and a surfactant, it is possible to achieve both of power transmission properties and noise suppression properties in a wet state, and it is possible to maintain the both sustainably. In addition, in the present invention, a higher power transmission performance can be exhibited in a dry state, too. Furthermore, the present invention is excellent in wear resistance and is able to enhance durability of the belt.

MODES FOR CARRYING OUT THE INVENTION

The friction transmission belt of the present invention has a friction transmission part (or a friction transmission surface) capable of being engaged in or coming into contact with a pulley, and the friction transmission part is formed of a rubber composition containing an ethylene-α-olefin elastomer, a mineral-based filler (or a non-carbon-based filler) and a surfactant.

The ethylene-α-olefin elastomer (ethylene-α-olefin-based rubber) is excellent in heat resistance, durability and economy, and is also environmentally friendly because it does not contain a halogen. The ethylene-α-olefin elastomer is not particularly limited, and examples thereof include an ethylene-α-olefin rubber, an ethylene-α-olefin-diene rubber, and the like.

Examples of the α-olefin include a chain α-$C_{3-12}$ olefin such as propylene, butene, pentene, methylpentene, hexene, and octene, and the like. The α-olefin can be used solely or in combination of two or more kinds thereof. Of these α-olefins, an α-$C_{3-4}$ olefins such as propylene (especially propylene) is preferable.

A proportion (mass ratio) of ethylene and the α-olefin may be from about 40/60 to 90/10, preferably from about 45/55 to 85/15 (e.g., from 50/50 to 82/18), and more preferably from about 55/45 to 80/20 (e.g., from 55/45 to 75/25) in terms of the former/the latter.

In the present invention, in the case where the ethylene-α-olefin elastomer contains a diene-based monomer, examples of the diene-based monomer include a non-conjugated diene-based monomer, for example, a $C_{5-15}$ non-conjugated diene-based monomer such as dicyclopentadiene, methylene norbornene, ethylidene norbornene, 1,4-hexadiene, and cyclooctadiene, and the like. Such a diene-based monomer can be used solely or in combination of two or more kinds thereof.

A proportion of the diene-based monomer can be selected within the range of from about 4 to 15% by mass in the ethylene-α-olefin elastomer, and for example, it may be from about 4.2 to 13% by mass (e.g., from 4.3 to 12% by mass), and preferably from about 4.4 to 11.5% by mass (e.g., from 4.5 to 11% by mass).

Examples of the representative ethylene-α-olefin elastomer include an ethylene-α-olefin rubber [e.g., an ethylene-propylene rubber (EPR)], an ethylene-α-olefin-diene rubber [e.g., an ethylene-propylene-diene copolymer (EPDM), etc.)], and the like.

Such an ethylene-α-olefin elastomer can be used solely or in combination of two or more kinds thereof. Of these ethylene-α-olefin elastomers, an ethylene-α-olefin-diene rubber such as EPDM is preferable. It is to be noted that an iodine value of the ethylene-α-olefin-diene rubber may be, for example, from about 3 to 40, preferably from about 5 to 30, and more preferably from about 10 to 20. When the iodine value is too small, vulcanization of the rubber composition is insufficient so that wear or adhesion is easily generated, whereas when the iodine value is too large, scorch of the rubber composition is short so that there is a tendency that not only handling is difficult, but heat resistance is lowered. The iodine value can be, for example, measured with an infrared spectrophotometer.

In the friction transmission belt of the present invention, maybe because the mineral-based filler (or the non-carbon-based powdered granular filler) can appropriately lower a coefficient of friction in a dry state while suppressing a lowering of a coefficient of friction in a wet state, thereby decreasing a difference in the coefficient of friction between a dry state and a wet state, it may possibly contribute to enhancement of the power transmission properties and suppression of a slip noise in a wet state.

Examples of the mineral-based filler include a metal carbonate (e.g., an alkaline earth metal carbonate such as calcium carbonate), a metal silicate (e.g., calcium silicate, magnesium silicate, aluminum silicate, magnesium aluminosilicate, talc, clay, mica, diatomaceous earth, kaolin, bentonite, smectite, wollastonite), a metal oxide as the filler (e.g., silica (dry silica or wet silica), alumina), and the like. Such a mineral-based filler can be used solely or in combination of two or more kinds thereof. Of these mineral-based fillers, calcium carbonate, magnesium silicate, aluminum silicate, calcium silicate, talc, clay, and silica (e.g., calcium carbonate, talc, clay) are preferable, with calcium carbonate and clay being especially preferable.

A pH of the mineral-based filler may be about 7 or more (e.g., from 7 to 10), preferably from about 7.5 to 9.8, and more preferably from about 8 to 9.5 in accordance with JIS K5101 (2004). When a surfactant exhibits acidity, there may be the case where a crosslinking reaction of the rubber composition is hindered; however, when the pH of the mineral-based filler falls within the foregoing range, not only the mineral-based filler can stably exist in the rubber composition, but also the crosslinking reaction of the rubber composition is efficiently advanced, thereby enabling a crosslinking density to be increased, and as a result, the power transmission properties and the noise suppression properties in a wet state can be much more improved.

An average particle diameter (primary average particle diameter) of the mineral-based filler may be, for example, from about 0.5 to 20 μm, preferably from about 0.7 to 15 μm, and more preferably from about 1 to 10 μm (e.g., from 1 to 5 μm). The average particle diameter can be measured by a customary method, for example, an air permeability method, a laser diffraction method, etc.

A specific surface area of the mineral-based filler may be, for example, from about 0.1 to 100 $m^2/g$, preferably from about 0.5 to 50 $m^2/g$, and more preferably from about 1 to 10 $m^2/g$. The specific surface area can be measured by a customary method, for example, an air permeability method, a nitrogen gas adsorption method, etc.

A proportion of the mineral-based filler may be, for example, from about 1 to 60 parts by mass, preferably from about 2 to 55 parts by mass, and more preferably from about 5 to 50 parts by mass (e.g., from 7 to 45 parts by mass, and preferably from 10 to 40 parts by mass) based on 100 parts by mass of the ethylene-α-olefin elastomer. When the amount of the mineral-based filler is either too small or too large, maybe because a difference in coefficient of friction between a dry state and a wet state is large, a slip noise is easily generated, and the transmission performance in a wet state tends to be lowered.

In the friction transmission belt of the present invention, maybe because the surfactant suppresses formation of an inclination of the coefficient of friction in the friction transmission part in a wet state, enables the coefficient of friction in a wet state to be increased, and makes a water film formed between the friction transmission part and the pulley thin, thereby enabling a friction force between the friction transmission part and the pulley to be enhanced, it may be estimated to contribute to achieving both the power transmission properties and the noise suppression properties in a wet state together with the mineral-based filler. The surfactant may be a cationic surfactant, an anionic surfactant, an ampholytic surfactant, or the like; however, a nonionic surfactant is preferable from the standpoints that it can keep the surface of the friction transmission part hydrophilic to make the water film to be formed thin, thereby increasing the coefficient of friction in a wet state.

Examples of the nonionic surfactant include an ether type, an ester type, an ester ether type, a nitrogen-containing type, and the like. Examples of the ether type nonionic surfactant include a (poly)alkane polyol alkyl ether (e.g., a poly-$C_{2-3}$-alkylene glycol $C_{8-24}$-alkyl ether such as a poly-$C_{2-3}$-alkylene glycol mono-2-ethylhexyl ether, a poly-$C_{2-3}$-alkylene glycol monononyl ether, a poly-$C_{2-3}$-alkylene glycol monodecyl ether, a poly-$C_{2-3}$-alkylene glycol monolauryl ether, a poly-$C_{2-3}$-alkylene glycol monotridecyl ether, a poly-$C_{2-3}$-alkylene glycol monoacetyl ether, a poly-$C_{2-3}$-alkylene glycol monostearyl ether, and a poly-$C_{2-3}$-alkylene glycol monooleyl ether, etc.); a (poly)alkane polyol aryl ether (e.g., a poly-$C_{2-3}$-alkylene glycol $C_{8-24}$-alkyl $C_{6-10}$-aryl ether such as a poly-$C_{2-3}$-alkylene glycol monooctylphenyl ether and a poly-$C_{2-3}$-alkylene glycol mononylphenyl ether, etc.); a (poly)alkane polyol aralkyl ether (e.g., a poly-$C_{2-3}$-alkylene glycol mono-$C_{6-10}$-aryl-$C_{1-4}$-alkyl ether such as a poly-$C_{2-3}$-alkylene glycol monocumylphenyl ether, etc.); a polyoxyethylene polyoxypropylene block copolymer; and the like.

Examples of the ester type nonionic surfactant include a fatty acid ester of a trihydric or polyhydric alcohol, for example, a glycerin $C_{8-24}$-fatty acid ester such as glycerin monostearate ester; a pentaerythritol $C_{8-24}$-fatty acid ester such as a pentaerythritol ditallowate ester; a sucrose $C_{8-24}$-fatty acid ester such as sucrose monostearate ester and sucrose dioleate ester; a sorbitan $C_{8-24}$-fatty acid ester (or a sorbitol $C_{8-24}$-fatty acid ester) such as sorbitan mono- to trioleate ester; and the like.

Examples of the ester ether type nonionic surfactant include a polyalkylene glycol fatty acid ester (e.g., a poly-$C_{2-3}$-alkylene glycol $C_{8-24}$-fatty acid ester such as polyethylene glycol monolaurate ester, etc.), a fatty acid ester of a $C_{2-3}$-alkylene oxide adduct of a trihydric or polyhydric alcohol (e.g., a polyoxy-$C_{2-3}$-alkylene glycerin $C_{8-24}$-fatty acid ester such as polyoxyethylene glycerin stearate ester and polyoxyethylene castor oil; and a polyoxy-$C_{2-3}$-alkylene sorbitan $C_{8-24}$-fatty acid ester (or a polyoxy-$C_{2-3}$-alkylene sorbitol $C_{8-24}$-fatty acid ester) such as polyoxyethylene sorbitan monostearate ester, etc.), and the like.

Examples of the nitrogen-containing type nonionic surfactant include a $C_{2-3}$-alkylene oxide adduct of a $C_{8-24}$-alkylamine such as polyoxyethylene laurylamino ether and polyoxyethylene stearylamino ether; a fatty acid alkanolamide or a $C_{2-3}$ alkylene oxide adduct thereof (e.g., a $C_{8-24}$-fatty acid alkanolamide or a $C_{2-3}$ alkylene oxide adduct thereof such as coconut oil fatty acid diethanolamide and polyoxyethylene coconut oil fatty acid monoethanolamide, etc.); and the like.

Such a nonionic surfactant can be used solely or in combination of two or more kinds thereof. Of these nonionic surfactants, a nonionic surfactant containing at least a polyoxyethylene unit is preferable, and a nonionic surfactant containing a polyoxyethylene unit and a polyoxypropylene unit is preferable, too. Furthermore, of these nonionic surfactants, an ether type nonionic surfactant such as a poly-$C_{2-3}$-alkylene glycol $C_{10-16}$-alkyl ether and a polyoxyethylene polyoxypropylene block copolymer is preferable.

An HLB of the nonionic surfactant may be, for example, from about 1 to 20, preferably from about 5 to 17, and more preferably from about 8 to 15. When the HLB is too small, noise is easily generated in a wet state, whereas when the HLB is too high, though quick-acting properties of the effect for suppressing noise generation are revealed, the durability may fail.

A proportion of the surfactant may be, for example, from about 1 to 25 parts by mass, preferably from about 1.5 to 20 parts by mass and more preferably from about 2 to 15 parts by mass (e.g., from 2 to 10 parts by mass) based on 100 parts by mass of the ethylene-α-olefin elastomer. When the amount of the surfactant is too small relative to the ethylene-α-olefin elastomer, maybe because a difference in coefficient of friction between a dry state and a wet state is large, the noise is easily generated in a wet state; whereas when the amount of the surfactant is too large, the surfactant bleeds out into the friction transmission part, the power transmission performance is lowered, and a strange sound is easily generated in a wet state.

A proportion of the surfactant may be, for example, from about 1 to 100 parts by mass, preferably from about 3 to 80 parts by mass, and more preferably from about 5 to 50 parts by mass (e.g., from 10 to 40 parts by mass) based on 100 parts by mass of the mineral-based filler.

A viscosity of the surfactant may be, for example, from about 10 to 250 mPa·s, preferably from about 15 to 220 mPa·s, and more preferably from about 20 to 200 mPa·s at 25° C. When the viscosity of the surfactant is too low, the heat resistance of the friction transmission belt is lowered, whereas when the viscosity is too high, the friction transmission part cannot be sufficiently modified. The viscosity can be measured with a B-type viscometer at 12 rpm/25° C. according to the viscosity measurement method with a uni-cylinder rotational viscometer in accordance with JIS Z8803 (2011).

If desired, the rubber composition may contain an additive other than the surfactant and the mineral-based filler, such as a plasticizer, carbon black (or a carbon-based filler), a short fiber, a vulcanizing agent (or a crosslinking agent), a co-vulcanizing agent (or a co-crosslinking agent), a vulcanization accelerator (or a crosslinking aid), a vulcanization retardant, an adhesion improver, an antioxidant, a tackifier, a stabilizer, a coupling agent, a plasticizer, a lubricant, and a coloring agent. Such an additive can be used solely or in combination of two or more kinds thereof. Of these additives, a plasticizer, carbon black, a short fiber, a vulcanizing agent, a co-vulcanizing agent, a vulcanization accelerator, an antioxidant, and the like are used for a general purpose.

The plasticizer is not particularly limited, and in many cases, for example, a paraffin-based plasticizer such as a $C_{4-155}$-paraffin or a derivative thereof (e.g., a $C_{4-50}$-paraffin or a derivative thereof) is used. Specific examples of the paraffin-based plasticizer include a linear saturated hydrocarbon (e.g., an n-paraffin such as butane, pentane, hexane, heptane, octane, nonane, decane, undecane, dodecane, tetradecane, pentadecane, hexadecane, heptadecane, and octadecane, etc.), a branched saturated hydrocarbon (e.g., an isoparaffin such as isobutane, isopentane, neopentane, isohexane, isopentane, neohexane, 2,3-dimethylbutane, 2-methylhexane, 3-methylhexane, and 3-ethylpentane, etc.), a derivative of such a saturated hydrocarbon, and the like.

The paraffin-based plasticizer can be, for example, available as "NA SOLVENT (isoparaffin-based hydrocarbon oil)" from NOF Corporation, "PW-90 (n-paraffin-based process oil)" from Idemitsu Kosan Co., Ltd., "IP-SOLVENT 2835 (synthetic isoparaffin-based hydrocarbon containing 99.8% by weight or more of an isoparaffin)" from Idemitsu Petrochemical Co., Ltd., or "NEOTHIOSOL (n-paraffin-based process oil)" from Sanko Chemical Industry Co., Ltd. The plasticizer can be used solely or in combination of two or more kinds thereof. The plasticizer is preferably in liquid state at room temperature.

A proportion of the plasticizer (e.g., a paraffin-based plasticizer) may be, for example, from about 1 to 30 parts by mass, preferably from about 2 to 25 parts by mass, and more preferably from about 3 to 20 parts by mass based on 100 parts by mass of the ethylene-α-olefin elastomer. So long as the proportion of the plasticizer falls within the foregoing range, the hydrophilicity of the friction transmission part can be kept.

Examples of the carbon black include a furnace black such as SAF, ISAF, HAF, MAF, FEF, GPF, and SRF, and the like. Such carbon black can be used solely or in combination of two or more kinds thereof. Of these carbon blacks, HAF, GPF, and the like are used for a general purpose.

A proportion of the carbon black may be, for example, from about 10 to 100 parts by mass, preferably from about 20 to 80 parts by mass, and more preferably from about 30 to 70 parts by mass (e.g., from 40 to 60 parts by mass) based on 100 parts by mass of the ethylene-α-olefin elastomer. In addition, a proportion of the carbon black may be, for example, from about 1 to 100 parts by mass, and preferably from about 5 to 80 parts by mass based on 100 parts by mass of the mineral-based filler.

Examples of the short fiber include a natural fiber (e.g., cotton, linen, etc.), a regenerated fiber (e.g., rayon, acetate, etc.), an inorganic fiber (e.g., a metal fiber, a glass fiber, a carbon fiber, etc.), a synthetic fiber, and the like. Examples of the synthetic fiber include a polyolefin-based fiber (e.g., a polyethylene fiber, a polypropylene fiber, etc.), a styrene-based fiber, a polyfluoroethylene-based fiber, an acrylic fiber, a vinyl alcohol-based fiber, a polyester-based fiber (e.g., a wholly aromatic polyester such as a poly-$C_{2-4}$-alkylene acrylate-based fiber such as polyethylene terephthalate and polyethylene naphthalate, and a liquid crystal polyester fiber), a polyamide-based fiber (e.g., an aliphatic polyamide fiber such as polyamide 6 and polyamide 66, a wholly aromatic polyamide-based fiber such as an aramid fiber, etc.), a polyurethane-based fiber, and the like. Such a fiber can be used solely or in combination of two or more kinds thereof. Of these fibers, a cellulose-based fiber such as cotton and rayon, a polyester-based fiber (e.g., a polyethylene terephthalate-based fiber, etc.), a polyamide fiber (e.g., an aliphatic polyamide fiber such as polyamide 66, an aramid fiber, etc.), and the like are used for a general purpose.

A proportion of the short fiber may be, for example, from about 1 to 100 parts by mass, preferably from about 5 to 50 parts by mass, and more preferably from about 10 to 30 parts by mass based on 100 parts by mass of the ethylene-α-olefin elastomer.

The vulcanizing agent can be classified into a sulfur-based vulcanizing agent and a non-sulfur-based vulcanizing agent. Examples of the sulfur-based vulcanizing agent include sulfur (e.g., powered sulfur, precipitated sulfur, colloidal sulfur, insoluble sulfur, highly dispersible sulfur, etc.), a sulfur compound (e.g., a sulfur chloride such as sulfur monochloride, sulfur dichloride, etc.), and the like.

Examples of the non-sulfur-based vulcanizing agent include an organic peroxide [e.g., a diacyl peroxide (e.g., dibenzoyl peroxide), a peroxy ester, a dialkyl peroxide (e.g., di-t-butyl peroxide, t-butylcumyl peroxide, dicumyl peroxide, 1,1-di-butylperoxy-3,3,5-trimethylcyclohexane, 2,5-dimethyl-2,5-di(t-butylperoxy)-hexane, 2,5-dimethyl-2,5-di(t-butylperoxy)hexine-3,1,3-bis(t-butylperoxy-isopropyl) benzene, etc.), etc.], a metal oxide as a vulcanizing agent [e.g., zinc oxide, magnesium oxide, lead oxide, etc.], an organic polyvalent amine [e.g., triethylene tetramine, hexamethylenediamine carbamate, 4,4'-methylenebis-orthochloroaniline, etc.], and the like.

The vulcanizing agent can be used solely or in combination of two or more kinds thereof. A preferred vulcanizing agent contains at least sulfur or an organic peroxide, and in general, in many cases, it contains sulfur, an organic peroxide, and a metal oxide.

A proportion of the vulcanizing agent may be about not more than 30 parts by mass, preferably from about 0.01 to 25 parts by mass, preferably from about 0.05 to 20 parts by mass, and more preferably from about 0.1 to 15 parts by mass based on 100 parts by mass of the ethylene-α-olefin elastomer.

Examples of the co-vulcanizing agent include a brominated olefin, a metal salt of an unsaturated carboxylic acid [e.g., a metal salt of (meth)acrylic acid (e.g., an alkaline earth metal salt, a transition metal salt, etc.) etc.], an oxime [e.g., quinone dioxime, etc.], a maleimide [e.g., bismaleimide, phenylmaleimide, N—N'-m-phenylene bismaleimide, etc.], a polyfunctional (meth)acrylate [e.g., an alkane polyol poly(meth)acrylate such as ethylene glycol di(meth)acrylate and trimethylolpropane tri(meth)acrylate, etc.], a polyfunctional(iso)cyanurate [e.g., triallyl(iso)cyanurate, etc.], and the like.

The co-vulcanizing agent can be used solely or in combination of two or more kinds thereof. A proportion of the co-vulcanizing agent may be, for example, not more than about 30 parts by mass, preferably from about 0.1 to 20 parts by mass, and more preferably from about 0.5 to 15 parts by mass (e.g., from 1 to 10 parts by mass) based on 100 parts by mass of the ethylene-α-olefin elastomer.

Examples of the vulcanization accelerator include a thiuram-based accelerator (e.g., tetramethylthiuram monosulfide (TMTM), tetramethylthiuram disulfide (TMTD), tetraethylthiuram disulfide (TETD), tetrabutylthiuram disulfide (TBTD), dipentamethylenethiuram tetrasulfide (DPTT), etc.), a thiazole-based accelerator (e.g., 2-mercaptobenzothiazole or a salt thereof, etc.), a sulfenamide-based accelerator (e.g., N-cyclohexyl-2-benzothiazyl sulfenamide, etc.), a urea-based accelerator (e.g., ethylenethiourea etc.), a combination thereof, and the like.

A proportion of the vulcanization accelerator may be, for example, not more than about 30 parts by mass, preferably from about 0.1 to 20 parts by mass, and more preferably from about 0.5 to 15 parts by mass (e.g., from 1 to 10 parts by mass) based on 100 parts by mass of the ethylene-α-olefin elastomer.

Examples of the antioxidant include an amine-based antioxidant, a phenol-based antioxidant, a combination thereof, and the like. A proportion of the antioxidant may be, for example, not more than about 30 parts by mass, preferably from about 0.1 to 20 parts by mass, and more preferably from about 0.5 to 15 parts by mass (e.g., from 1 to 10 parts by mass) based on 100 parts by mass of the ethylene-α-olefin elastomer.

The rubber composition (unvulcanized rubber composition) can be prepared by a customary method, for example, by mixing (or kneading) the respective components with a mixing machine (or a kneading machine) such as a Banbury mixer, a kneader, etc.

The friction transmission belt is not particularly limited so long as a friction transmission part thereof capable of being engaged in or coming into contact with a pulley is formed of the above-described rubber composition. In general, the friction transmission belt is provided with a compression layer (or a compressed rubber layer), and a friction transmission part (or a friction transmission surface) of the compression layer may be formed of the above-described rubber composition, or the whole of the compression layer may be formed of the above-described rubber composition.

Figure 1:
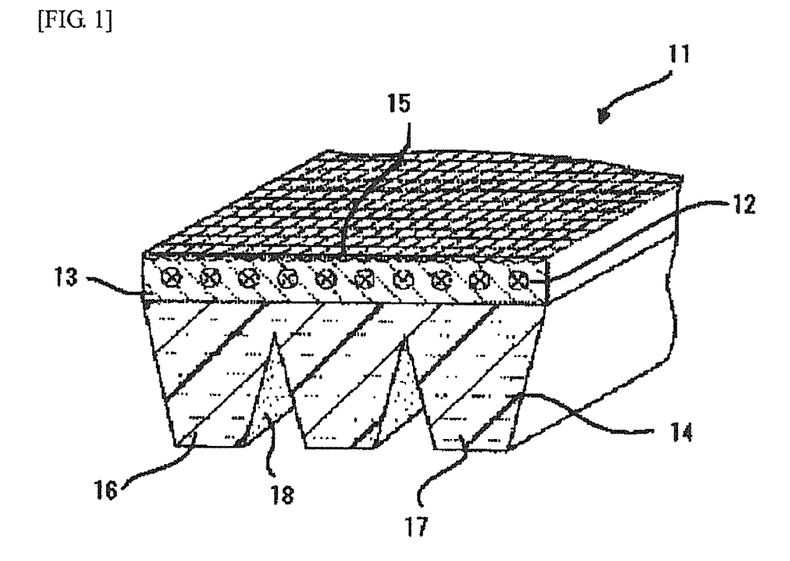
FIG. 1 is a diagrammatic cross-sectional view illustrating an example of a friction transmission belt of the present invention.

FIG. 1 is a diagrammatic cross-sectional view illustrating an example of the friction transmission belt of the present invention. A V-ribbed belt 11 shown in FIG. 1 is provided with an adhesive layer 13 having a tension member 12 embedded therein along the belt longitudinal direction; a compression layer 14 which is laminated on one surface of this adhesive layer 13 and which contains a short fiber 16 oriented in the belt width direction; and a stretching layer 15 which is formed on the other surface of the adhesive layer 13 and which is composed of a cover canvas. In the compression layer 14, a V-shaped groove is cut to form a rib 17. It is to be noted that a rub surface (rib side surface) 18 of the compression layer 14 is the friction transmission surface.

As the tension member 12, in general, use can be made of a twisted yarn cord of multifilament yarns (e.g., organzine, single-twist, Lang's lay, etc.). An average wire diameter of the tension member 12 (fiber diameter of the twisted cord) is, for example, from about 0.3 to 3 mm, preferably from about 0.4 to 2.5 mm, and more preferably from about 0.5 to 2 mm. Examples of the fiber that constitutes the tension member 12 include the same fiber as the above-described short fiber, for example, a poly-$C_{2-4}$-alkylene acrylate fiber such as a polyethylene terephthalate (PET) fiber, a polytrimethylene terephthalate (PTT) fiber, a polybutylene terephthalate (PBT) fiber, and a polyethylene naphthalate (PEN) fiber, a poly-p-phenylene benzobisoxazole (PBO) fiber, a polyamide fiber, a glass fiber, an aramid fiber, a combination thereof, and the like. The tension member 12 may be treated (coated or impregnated) with a treatment liquid containing resorcin, formalin, and a latex (RFL liquid) for the purpose of enhancing adhesion to the adhesive layer 13. The RFL liquid may contain the additives exemplified in the section of the rubber composition that forms the friction transmission part.

The adhesive layer 13 may be formed of a rubber composition of the same kind as or different kind from the rubber composition that forms the friction transmission part. In the rubber composition that forms the adhesive layer 13, the rubber can be properly selected depending on the kind of the rubber of the compression layer 14 or the stretching layer 15, or the like. Examples thereof include an olefin-based rubber (e.g., an ethylene-α-olefin elastomer, a polyoctenylene rubber, etc.), a diene-based rubber (e.g., a natural rubber, an isoprene rubber, a butadiene rubber, a chloroprene rubber, a styrene butadiene rubber, a nitrile rubber, a hydrogenated nitrile rubber, etc.), a combination thereof; and the like, and a rubber containing at least an ethylene-α-olefin elastomer is preferable. In addition, the rubber composition that forms the adhesive layer 13 may contain the additives exemplified in the section of the rubber composition that forms the friction transmission part.

Examples of the canvas that constitutes the stretching layer 15 include a woven fabric, a knitted fabric, a nonwoven fabric, and the like. Examples of the fiber that constitutes the canvas include the same fiber as the above-described short fiber, for example, a natural fiber such as cotton and linen; an inorganic fiber such as a metal fiber and a glass fiber; an organic fiber such as a polyamide fiber, a polyester fiber, a polyethylene fiber, a polyurethane fiber, a polystyrene fiber, a polyfluoroethylene fiber, a polyacrylic fiber, a polyvinyl alcohol fiber, a wholly aromatic polyester fiber, and an aramid fiber; a combination thereof; and the like. The woven fabric is woven by subjecting a yarn constituted of the above-described fiber to plain weaving, twill weaving, satin weaving, or the like.

The canvas may be treated with an RFL liquid. In addition, the canvas having been treated with an RFL liquid may be subjected to friction treating for rubbing an unvulcanized rubber thereinto, or may be treated with a soaking liquid containing an unvulcanized rubber and a solvent.

The friction transmission belt shown in FIG. 1 is fabricated by, for example, successively winding a canvas for stretching layer and a first unvulcanized rubber sheet for adhesive layer around a cylindrical flat molding die; helically spinning a tension member thereon; further successively winding a second unvulcanized rubber sheet for adhesive layer and an unvulcanized rubber sheet for compression layer therearound to form a laminate; vulcanizing this laminate while pressing onto the molding die to fabricate a vulcanized belt sleeve; grinding a compression layer of the vulcanized belt sleeve with a grinder to form a plurality of ribs; and cutting the vulcanized belt sleeve in a prescribed width in the circumferential direction to finish into a V-ribbed belt having a prescribed number of ribs.

Figure 2:
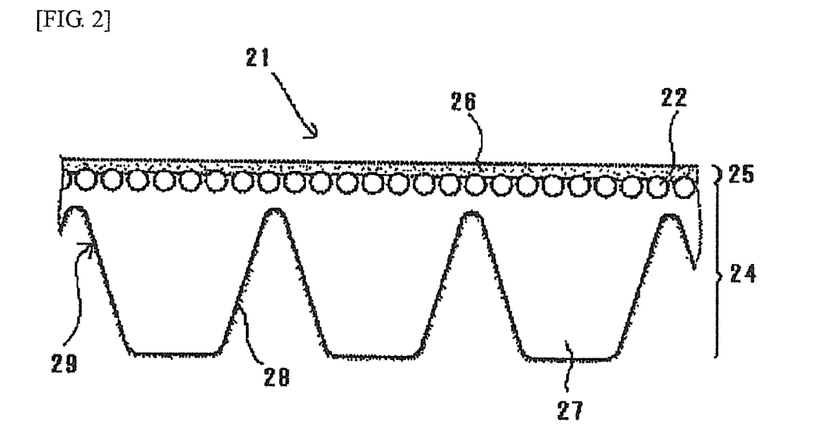
FIG. 2 is a diagrammatic cross-sectional view illustrating another example of a friction transmission belt of the present invention.

FIG. 2 is a diagrammatic cross-sectional view illustrating another example of the friction transmission belt of the present invention. A V-ribbed belt 21 shown in FIG. 2 is provided with a compression layer 24 and a stretching layer 25 which is laminated on one surface of the compression layer 24 and contains a short fiber 26 oriented randomly. In the compression layer 24, a plurality of ribs 27 extending in the belt longitudinal direction are formed, and a flocked layer 29 having a short fiber fixed thereon is formed on a surface of each of these ribs.

In this example, the tension member 22 is embedded in the belt main body along the belt longitudinal direction, the center of the tension member 22 is positioned at a boundary between the compression layer 24 and the stretching layer 25, and the tension member 22 comes into contact with both of the compression layer 24 and the stretching layer 25. The same tension member as described above can be used as the tension member 22.

In this example, the compression layer 24 does not contain a short fiber from the standpoint of adhesion to the tension member 22. The rubber composition that forms the compression layer 24 can be formed of the same rubber composition as described above so long as it does not contain a short fiber.

The stretching layer 25 is not particularly limited so long as it contains a short fiber, and it may be formed of a rubber composition of the same kind as or different kind from the rubber composition that forms the friction transmission part. In the rubber composition that forms the stretching layer 25, the same rubbers as those in the adhesive layer can be exemplified, and the rubber may contain an additive other than the short fiber.

Though the short fiber which is contained in the stretching layer 25 may be oriented in a prescribed direction such as the belt width direction, etc., in this example, it is oriented randomly, and therefore, the generation of tearing or cracking from multiple directions can be suppressed. Furthermore, when a short fiber having a bent part (e.g., a milled fiber) is selected, the resistance to forces acting from multiple directions can be revealed.

In the stretching layer 25, in order to suppress a strange sound at the time of driving on the back surface, a concave-convex pattern may be formed on the back surface. Examples of the concave-convex pattern include a knitted fabric pattern, a woven fabric pattern, a cord fabric pattern, and the like, with a woven fabric pattern being especially preferable.

The friction transmission belt shown in FIG. 2 is fabricated by, for example, winding an unvulcanized rubber sheet for stretching layer around a circumferential surface of a stretchable bladder provided on the outer circumferential surface of a cylindrical die; helically spinning a tension member thereon; further winding an unvulcanized rubber sheet for compression layer to form a laminate; fitting this die in a vulcanization die having a concave-convex part for molding on the inner circumferential surface thereof; vulcanizing the laminate while pressing onto the inner circumferential surface of the vulcanization die by expanding the bladder, thereby fabricating a vulcanized belt sleeve having a plurality of ribs; and cutting the vulcanized belt sleeve in a prescribed width in the circumferential direction to finish into a V-ribbed belt having a prescribed number of ribs.

In this way, the representative friction transmission belt of the present invention has a tension member which is embedded in the belt main body along the belt longitudinal direction, and the belt main body is provided with a compression layer having a convex part (e.g., a rib, a cog, etc.) on one surface thereof (inner circumferential surface of the belt) and an adhesive layer and/or a stretching layer laminated on the other surface of the compression layer (outer circumferential surface of the belt). In this friction transmission belt, the side surface of the convex part of the compression layer is a friction transmission part (friction transmission surface) capable of being engaged in or coming into contact with a pulley, and the friction transmission part (the convex part or compression layer) is formed of a rubber composition containing an ethylene-α-olefin elastomer, a mineral-based filler and a surfactant.

A coefficient of friction ($\mu_1$) of the friction transmission belt in a dry state may be, for example, from about 0.7 to 0.9, preferably from about 0.71 to 0.88, and more preferably from about 0.72 to 0.86. In addition, a coefficient of friction ($\mu_2$) of the friction transmission belt in a wet state (water-dampened state or water-poured state) may be, for example, from about 0.45 to 0.7, preferably from about 0.47 to 0.67, and more preferably from about 0.5 to 0.65. Coefficient of friction can be measured under a condition at a slip velocity of 0.3 m/sec according to the method of the Examples as described later.

A difference in coefficient of friction of the friction transmission belt between a dry state and a wet state ($\mu_1-\mu_2$) may be, for example, not more than about 0.3, preferably from about 0.1 to 0.29, and more preferably from about 0.15 to 0.28. A ratio in coefficient of friction of the friction transmission belt between a dry state and a wet state may be, for example, from about 1.1/1 to 1.7/1, and preferably from about 1.2/1 to 1.6/1 (e.g., from 1.3/1 to 1.5/1) in terms of the former/the latter ($\mu_1/\mu_2$).

Figure 3:
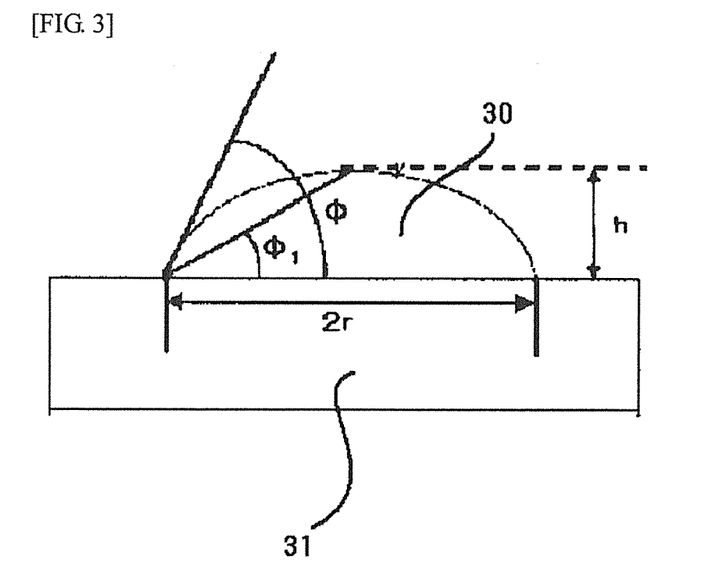
FIG. 3 is a schematic view for explaining a contact angle of water against a friction transmission part.

A contact angle of the friction transmission part (or the friction transmission surface) with water may be, for example, from about 40 to 75°, and preferably from about 45 to 70°. So long as the contact angle with water falls within the foregoing range, wettability with water is easily kept sustainably. The contact angle with water can be calculated from a projected photograph of a water droplet 30 dropped on a friction transmission surface 31 as shown in FIG. 3 by means of the ϕ/2 method according to the following formula.

$$\phi=2\tan^{-1}(h/r)$$

(In the formula, ϕ represents a contact angle; h represents a height of the water droplet; and r represents a radius of the water droplet.)

The friction transmission belt can be fabricated by a customary method, for example, by vulcanizing an unvulcanized rubber sheet formed of a rubber composition containing an ethylene-α-olefin elastomer, a mineral-based filler and a surfactant. For example, the friction transmission belt in which the tension member is embedded in the belt main body, which has a friction transmission surface capable of being engaged in or coming into contact with a pulley, along the belt longitudinal direction can be fabricated by vulcanizing a belt main body precursor which contains a first unvulcanized rubber sheet formed of a first rubber composition containing an ethylene-α-olefin elastomer, a mineral-based filler and a surfactant and a second unvulcanized rubber sheet formed of a second rubber composition containing an olefin-based rubber (e.g., an ethylene-α-olefin elastomer) and has a tension member allowed to intervene between the first unvulcanized rubber sheet and the second unvulcanized rubber sheet. In more detail, the friction transmission belt can be fabricated by successively winding the first unvulcanized rubber sheet, the tension member and the second unvulcanized rubber sheet around a cylindrical molding die (e.g., a molding die having a flat surface, a molding die having a convex part on a surface thereof, etc.) and vulcanizing the resultant to form a vulcanized belt sleeve, and then cutting this cylindrical vulcanized belt sleeve in a prescribed width in the circumferential direction. A vulcanization temperature may be, for example, from about 120 to 200° C., and preferably from about 150 to 180° C.

EXAMPLES

The present invention is hereunder described in more detail by reference to the Examples, but it should not be construed that the present invention is limited to the Examples.

(1) Contact Angle of Friction Transmission Surface with Water:

The contact angle with water was measured from a projected photograph of a water droplet dropped on a friction transmission surface with a full automatic contact angle meter (CA-W Model), manufactured by Kyowa Interface Science Co., Ltd. by means of the ϕ/2 method. The measurement was conducted 60 seconds after dropping, followed by evaluation.

Figure 4:
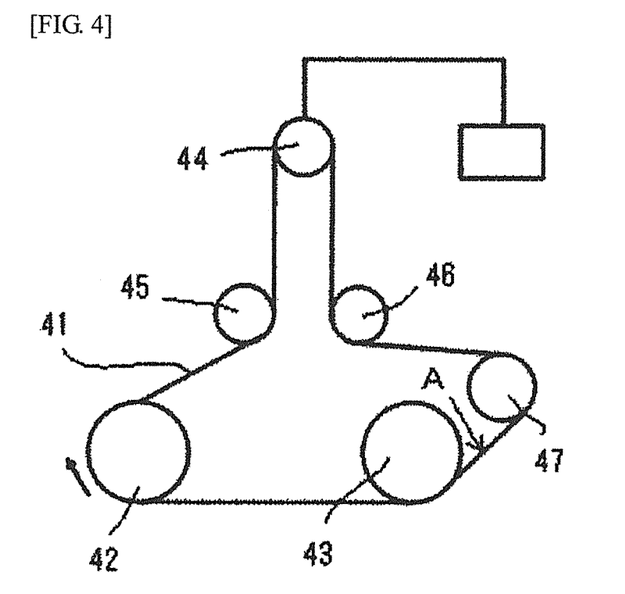
FIG. 4 is a diagrammatic view illustrating a test machine used for measurement of a coefficient of friction in the Examples.

(2) Friction Properties:

A running test machine used for the "coefficient of friction (μ)—belt slip velocity (V)" measurement is constituted in a mode illustrated in FIG. 4 so as to dispose a driving pulley 42 (diameter: 120 mm), a driven pulley 43 (diameter: 110 mm), a tension pulley 44 (diameter: 60 mm), and idler pulleys 45, 46 and 47 (diameter: 77 mm). A V-ribbed belt 41 was hung around each of the pulleys 42 to 47 of the test machine; winding angle of the V-ribbed belt 41 around the driven pulley 43 was adjusted to 50 degrees, winding angle around the tension pulley 44 was adjusted to 180 degrees, and winding angel around the idler pulley 47 was adjusted to 120 degrees; a load was given to the driving pulley 42 to run the V-ribbed belt 41 under a test condition at a rotation rate of the driving pulley 42 of from 0 to 300 rpm and a belt tension of 30 N/rib; and the driven pulley 43 was run by giving a load thereto.

The coefficient of friction was measured under a condition at a belt slip velocity of 0.3 m/sec according to the Euler's formula. The belt slip velocity was calculated from belt velocity and pulley velocity calculated by built-in encoder. The belt velocity was calculated by the built-in encoder of a rear idler part and calculated on the assumption that slip rate in the rear idler part is 0%.

The coefficient of friction in a wet state was measured by pouring water at a site A (between the driven pulley 43 and the idler pulley 47) toward the rib surface of the V-ribbed belt 41, thereby rendering the belt in a state of being always dampened with water.

Figure 5:
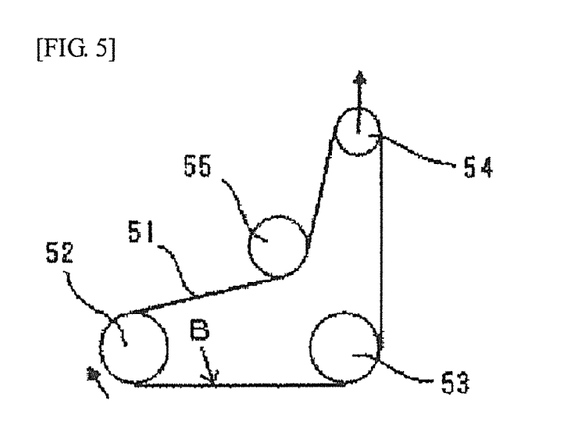
FIG. 5 is a diagrammatic view illustrating a test machine used for measurement of a transmission performance in the Examples.

(3) Transmission Performance Test:

A running test machine used for the transmission performance test is constituted in a mode illustrated in FIG. 5 so as to dispose a driving pulley 52 (diameter: 120 mm), a driven pulley 53 (diameter: 120 mm), a tension pulley 54 (diameter: 65 mm), and an idler pulley 55 (diameter: 80 mm). A V-ribbed belt 51 was hung around each of the pulleys 52 to 55 of the test machine; and winding angle of the V-ribbed belt 51 around the driving pulley 52 was adjusted to 180 degrees and winding angle around the driven pulley 53 was adjusted to 60 degrees.

In the transmission performance test, a load was given to the driven pulley 53 to promote a slip under a running condition at room temperature, a rotation rate of the driving pulley 52 of 2,000 rpm and a belt tension of 5 kgf/rib. The transmission performance was evaluated in terms of a transmission torque at a slip rate of 2%. The transmission performance in a wet state was measured by pouring water at a site B (between the driving pulley 52 and the driven pulley 53) toward the rib surface of the V-ribbed belt 51, thereby rendering the belt in a state of being always dampened with water.

Figure 6:
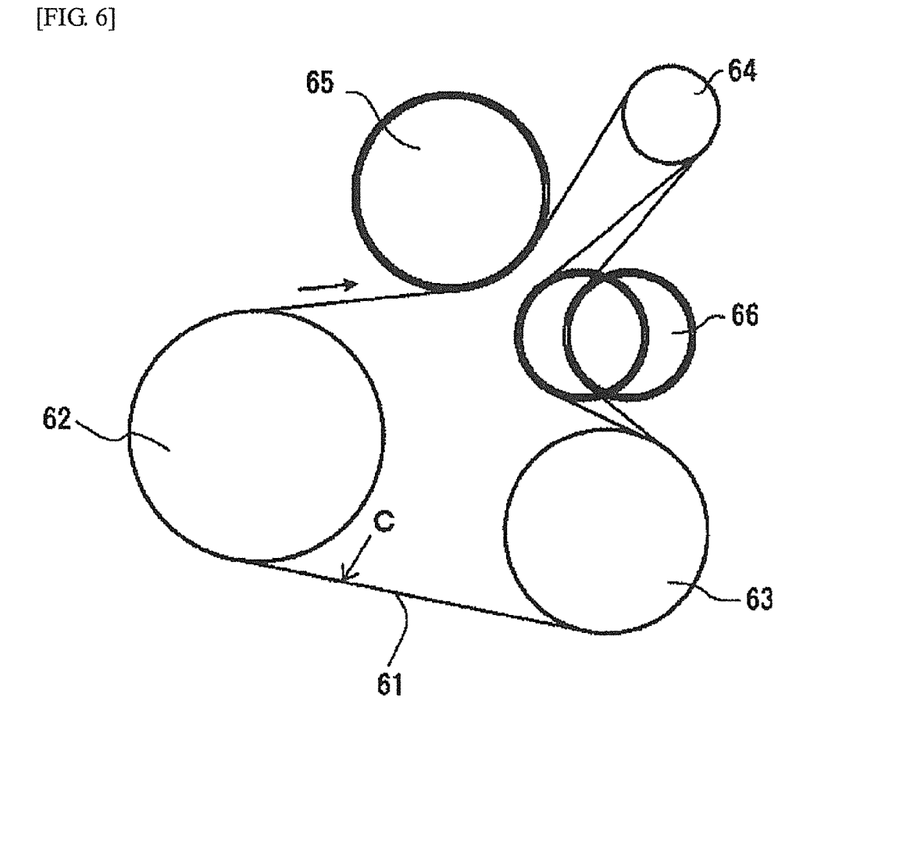
FIG. 6 is a diagrammatic view illustrating a test machine used for evaluation of noise generation in the Examples.

(4) Evaluation of Noise Generation:

A test machine used for evaluating the noise generation is constituted in a mode illustrated in FIG. 6 so as to dispose a crank pulley 62 (diameter: 140 mm), a compressor pulley 63 (diameter: 110 mm), an alternator pulley 64 (diameter: 55 mm), a water pump pulley 65 (diameter: 100 mm), and an idler pulley 66 (diameter: 70 mm). A V-ribbed belt 61 having a size of 6PK1140 was hung around each of the pulleys 62 to 66 of the test machine and run at a belt initial tension of 120 N/rib.

In a resting state of the belt running, 2.0 cc of water was poured at a site C (between the crank pulley 62 and the compressor pulley 63), and thereafter, an engine was started from a zero state and the presence or absence of noise generation at the time of starting was subjected to self-listening by an experimenter. As a result, the case where the noise generation cannot be confirmed was evaluated as "S"; the case where a slip noise can be slightly confirmed was evaluated as "A"; the case where although a slip noise can be confirmed, its sound is comparatively small was evaluated as "B"; and the case where a slip noise is confirmed, and its sound is large was evaluated as "C".

(5) Raw Materials:

EPDM: "EPT2060M", manufactured by Mitsui Chemicals, Inc.

Antioxidant: "NONFLEX OD3", manufactured by Seiko Chemical Co., Ltd.

Organic peroxide: "PERKADOX 14RP", manufactured by Kayaku Akzo Corporation

Surfactant 1: Polyoxyalkylene alkyl ether (ethylene oxide and propylene oxide adduct of $C_{12}C_{13}$-synthetic alcohol), "NEWCOL 2304-Y", manufactured by Nippon Nyukazai Co., Ltd., HLB: 9.3

Surfactant 2: Polyoxyalkylene alkyl ether, "EMULGEN LS-106", manufactured by Kao Corporation, HLB: 12.5

Surfactant 3: Polyoxyethylene tridecyl ether, "PEGNOL TE-10A", manufactured by Toho Chemical Industry Co., Ltd.

Calcium carbonate: "WHITON SSB", manufactured by Shiraishi Calcium Kaisha, Ltd., average primary particle diameter: 1.5 μm, pH: 9.8

Talc: "ST TALC", manufactured by Takehara Kagaku Kogyo Co., Ltd., average primary particle diameter: 9.0 μm, pH: 9.0

Clay: "SILICALITE", manufactured by Takehara Kagaku Kogyo Co., Ltd., average primary particle diameter: 1.5 pH: 8.0

Polyamide short fiber: "66 NYLON", manufactured by Asahi Kasei Corporation

Paraffin-based oil: "PW-90", manufactured by Idemitsu Kosan Co., Ltd.

HAF carbon black: "SEAST 3", manufactured by Tokai Carbon Co., Ltd.

Solid lubricant: Graphite

Examples 1 to 13 and Comparative Examples 1 to 2

(Fabrication of Unvulcanized Rubber Sheet for Compression Layer)

An unvulcanized rubber sheet for compression layer was fabricated by kneading 100 parts by mass of the EPDM polymer, 5 parts by mass of zinc white, 1 part by mass of stearic acid, 2 parts by mass of the antioxidant, 2 parts by mass of a co-crosslinking agent (N,N'-m-phenylene dimaleimide), 8 parts by mass of the organic peroxide, 0.3 parts by mass of sulfur, and prescribed amounts of additives shown in Table 1 with a Banbury mixer and then rolling the mixture with calendar rolls.

(Fabrication of Unvulcanized Rubber Sheet for Adhesive Layer)

An unvulcanized rubber sheet for adhesive layer was fabricated in the same manner as that in the unvulcanized rubber sheet for compression layer, except that the short fiber was not blended.

(Fabrication of V-Ribbed Belt)

Around a flat cylindrical molding mold were wound 2-ply rubber-attached cotton canvas and the unvulcanized rubber sheet for adhesive layer; a tension member composed of a polyester fiber rope was spun thereon; the unvulcanized rubber sheet for compression layer was further wound therearound; a jacket for vulcanization was then covered on the unvulcanized rubber sheet for compression layer; the molding mold was put into a vulcanization can and vulcanized; and a cylindrical vulcanized sleeve was then taken out from the molding mold. The compression layer of the vulcanized sleeve was ground with a grinder to form a plurality of ribs and cut into a belt with 3 ribs, respectively with a cutter, thereby finishing into a V-ribbed belt.

Results of the contact angle with water, friction properties, transmission performance test, and noise generation of the V-ribbed belt of each of the Examples and Comparative Examples are shown in the table.

TABLE 1

|  |  | Example | | | | | | | | | | | | | Comparative Example | |
|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 1 | 2 |
| Surfactant 1 | | 2 | 4 | — | — | 8 | 4 | 4 | 4 | 4 | 1.5 | 18 | 4 | 4 | 4 | — |
| Surfactant 2 | | — | — | 4 | — | — | — | — | — | — | — | — | — | — | — | — |
| Surfactant 3 | | — | — | — | 4 | — | — | — | — | — | — | — | — | — | — | — |
| Calcium carbonate | | 20 | 20 | 20 | 20 | 20 | 5 | 40 | — | — | 20 | 20 | — | — | — | — |
| Talc | | — | — | — | — | — | — | — | 20 | — | — | — | 4 | 60 | — | — |
| Clay | | — | — | — | — | — | — | — | — | 20 | — | — | — | — | — | 40 |
| Polyamide short fiber | | 25 | 25 | 25 | 25 | 25 | 25 | 25 | 25 | 25 | 25 | 25 | 25 | 25 | 25 | 25 |
| Paraffin-based oil | | 7 | 7 | 7 | 7 | 7 | 7 | 7 | 7 | 7 | 10 | 4 | 7 | 7 | 13 | 10 |
| HAF carbon black | | 55 | 55 | 55 | 55 | 55 | 55 | 55 | 55 | 55 | 55 | 65 | 55 | 55 | 55 | 55 |
| Solid lubricant | | — | — | — | — | — | — | — | — | — | — | — | — | — | 20 | — |
| EPDM | | 100 | 100 | 100 | 100 | 100 | 100 | 100 | 100 | 100 | 100 | 100 | 100 | 100 | 100 | 100 |
| Contact angle with water (°) | | 67 | 58 | 55 | 58 | 50 | 60 | 57 | 60 | 64 | 102 | 15 | 62 | 57 | 69 | 117 |
| Friction properties (μ) | Dry | 0.79 | 0.8 | 0.78 | 0.79 | 0.76 | 0.85 | 0.73 | 0.8 | 0.81 | 0.79 | 0.53 | 0.89 | 0.67 | 0.7 | 0.75 |
|  | Wet | 0.51 | 0.54 | 0.55 | 0.53 | 0.56 | 0.59 | 0.53 | 0.55 | 0.53 | 0.46 | 0.41 | 0.6 | 0.48 | 0.46 | 0.4 |
|  | Dry - Wet | 0.28 | 0.26 | 0.23 | 0.26 | 0.2 | 0.26 | 0.2 | 0.25 | 0.28 | 0.33 | 0.12 | 0.29 | 0.19 | 0.24 | 0.35 |
| Transmission performance (Nm) | Dry | 31.8 | 31.5 | 30.7 | 31 | 30.9 | 32.1 | 30.4 | 31.3 | 31 | 30.6 | 27.9 | 32.4 | 28.1 | 29.2 | 28.5 |
|  | Wet | 9.7 | 10.5 | 10.7 | 10.2 | 10.3 | 10 | 9.9 | 10.9 | 10 | — | — | 9.5 | 9.3 | 8.1 | 7.7 |
| Evaluation of noise generation | | S | S | S | S | S | S | S | S | S | A | A | A | A | B | C |

As is clear from the table, in Comparative Example 1, the coefficient of friction and transmission performance in a wet state were lowered, and a small strange sound was confirmed in the evaluation of noise generation. In Comparative Example 2, the contact angle with water and the difference in coefficient of friction between a dry state and a wet state are large; a large strange sound is confirmed in the evaluation of noise generation; and the transmission performance in both of a dry state and a wet state is low.

In contrast, in Examples 1 to 13, because of the combination of the mineral-based filler and the surfactant, the contact angle exhibiting wettability with water could be made low; the difference in coefficient of friction between a dry state and a wet state could be made low; a slip noise was not perceived in the evaluation of noise generation; and a high transmission performance in both of a dry state and a wet state was obtained.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2012-052759 filed on Mar. 9, 2012, and the contents thereof are incorporated herein by reference.

INDUSTRIAL APPLICABILITY

The transmission belt of the present invention can be utilized as a friction transmission belt such as a flat belt, a V belt and a V-ribbed belt. In addition, the friction transmission belt of the present invention is able to achieve both of power transmission properties and noise suppression properties in a wet state, and therefore, it can be suitably utilized for high-load transmission equipment to be used outdoor, such as automobiles, motorcycles and agricultural machines.

EXPLANATIONS OF NUMERALS OR LETTERS

11, 21, 31, 41, 51, 61: V-Ribbed belt
12, 22: Tension member
13: Adhesive layer
14, 24: Compression layer
15, 25: Stretching layer
16, 26: Short fiber
17, 27: Rib
18, 28: Friction transmission surface
29: Flocked layer
30: Water droplet
42, 52: Driving pulley
62: Crank pulley
43, 53: Driven pulley
63: Compressor pulley
44, 54: Tension pulley
64: Alternator pulley
45, 46, 47, 55, 66: Idler pulley
65: Water pump pulley
A, B, C: Water-pouring site

The invention claimed is:

1. A friction transmission belt comprising a friction transmission part,
wherein the friction transmission part is formed of a rubber composition comprising an ethylene-α-olefin elastomer, a mineral-based filler and a surfactant,
wherein the surfactant is a nonionic surfactant, wherein the content of the mineral-based filler is from 1 to 60 parts by mass based on 100 parts by mass of the ethylene-α-olefin elastomer, and wherein the content of the surfactant is from 1 to 25 parts by mass based on 100 parts by mass of the ethylene-α-olefin elastomer.

2. The friction transmission belt according to claim 1, wherein the mineral-based filler is at least one member selected from the group consisting of a metal carbonate, a metal silicate and a metal oxide.

3. The friction transmission belt according to claim 1, wherein the mineral-based filler is at least one member selected from the group consisting of calcium carbonate, magnesium silicate, aluminum silicate, calcium silicate, talc, clay, and silica.

4. The friction transmission belt according to claim 1 wherein a proportion of the mineral-based filler is from 5 to 50 parts by mass based on 100 parts by mass of the ethylene-α-olefin elastomer.

5. The friction transmission belt according to claims 1 to 4, wherein the mineral-based filler has a pH of 7 or more in accordance with JIS K5101 (2004).

6. The friction transmission belt according to claim 1, wherein the mineral-based filler has a primary average particle diameter of from about 0.5 to 20 μm.

7. The friction transmission belt according to claim 1, wherein the mineral-based filler has a specific surface area of from 0.1 to 100 $m^2/g$.

8. The friction transmission belt according to claim 1, wherein the surfactant is an ether type nonionic surfactant.

9. The friction transmission belt according to claim 1, wherein a proportion of the surfactant is from about 2 to 15 parts by mass based on 100 parts by mass of the ethylene-α-olefin elastomer.

10. The friction transmission belt according to claim 1, wherein a proportion of the surfactant is from 5 to 50 parts by mass based on 100 parts by mass of the mineral-based filler.

11. The friction transmission belt according to claim 1, wherein the rubber composition further comprises at least one member selected from the group consisting of a paraffin-based plasticizer, and carbon black.

12. A method for producing the friction transmission belt described in claim 1, the method comprising vulcanizing an unvulcanized rubber sheet formed of the rubber composition containing the ethylene-α-olefin elastomer, the mineral-based filler and the surfactant.

* * * * *